(12) United States Patent
Holcombe, Jr.

(10) Patent No.: US 9,587,207 B2
(45) Date of Patent: *Mar. 7, 2017

(54) N-PROPYL BROMIDE SOLVENT SYSTEMS (71) Applicant: ZYP COATINGS, INC., Oak Ridge, TN (US)

(72) Inventor: Cressie E Holcombe, Jr., Knoxville, TN (US)

(73) Assignee: ZYP COATINGS, INC., Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,614

(22) Filed: Jan. 6, 2016

(65) Prior Publication Data

US 2016/0115429 A1 Apr. 28, 2016

Related U.S. Application Data (63) Continuation of application No. 14/468,443, filed on Aug. 26, 2014, now Pat. No. 9,260,595.

(51) Int. Cl.

| | |
|---|---|
| *C11D 7/50* | (2006.01) |
| *C11D 7/28* | (2006.01) |
| *C09D 7/00* | (2006.01) |
| *C09K 3/30* | (2006.01) |
| *C08L 21/00* | (2006.01) |

(Continued)

(52) U.S. Cl.
CPC .............. *C11D 7/5018* (2013.01); *C08L 1/02* (2013.01); *C08L 1/28* (2013.01); *C08L 21/00* (2013.01); *C08L 39/06* (2013.01); *C09D 5/00* (2013.01); *C09D 7/001* (2013.01); *C09D 101/28* (2013.01); *C09J 101/28* (2013.01); *C09K 3/30* (2013.01); *C11D 3/3749* (2013.01); *C11D 7/266* (2013.01)

(58) Field of Classification Search
CPC ......... C11D 7/50; C11D 7/5018; C11D 7/266; C11D 7/28; C11D 9/225; C09D 7/00; C09K 3/30

See application file for complete search history.

(56) References Cited

U.S. PATENT DOCUMENTS

| | | |
|---|---|---|
| 3,239,478 A | 3/1966 | Harlan |
| 4,536,454 A | 8/1985 | Haasl |

(Continued)

OTHER PUBLICATIONS

Novee 3M Horizons Newsletter, Winter 2009.

(Continued)

*Primary Examiner* — Brian P Mruk
(74) *Attorney, Agent, or Firm* — Amy Allen Hinson; Nexsen Pruet, LLC (57) ABSTRACT

A solvent composition and system is disclosed having a composition including n-propyl bromide and a propionate containing liquid and/or a butyrate containing liquid. The solvent system may include approximately 35 to 92.5 weight percent propionate containing liquid and approximately 7.5 to 65 weight percent n-propyl bromide. Alternatively, the solvent system may include approximately 40 to 85 weight percent butyrate containing liquid and 15 to 60 weight percent, n-propyl bromide. The solvent system may incorporate a polymer, such as a synthetic rubber polymer. Further the solvent system preferably has high solvency while maintaining desirable evaporation rates and is preferably nonflammable, combustible, or minimally a class IC flammable liquid.

15 Claims, 3 Drawing Sheets

(51) Int. Cl.
  *C11D 3/37*   (2006.01)
  *C08L 1/02*   (2006.01)
  *C08L 39/06*  (2006.01)
  *C09D 5/00*   (2006.01)
  *C09D 101/28* (2006.01)
  *C09J 101/28* (2006.01)
  *C08L 1/28*   (2006.01)
  *C11D 7/26*   (2006.01)

(56) References Cited

U.S. PATENT DOCUMENTS

| | | |
|---|---|---|
| 4,745,139 A | 5/1988 | Haasl |
| 5,112,516 A | 5/1992 | Koetzle |
| 5,196,137 A | 3/1993 | Merchant |
| 5,314,940 A | 5/1994 | Stone |
| 5,393,451 A | 2/1995 | Koetzle |
| 5,610,128 A | 3/1997 | Zyhowski |
| 5,756,002 A | 5/1998 | Chen |
| 5,814,595 A | 9/1998 | Flynn |
| 6,020,299 A | 2/2000 | Chen |
| 6,274,543 B1 | 8/2001 | Milbrath |
| 6,303,549 B1 | 10/2001 | Burdzy |
| 6,429,176 B1 | 8/2002 | Chen |
| 6,478,880 B1 | 11/2002 | Shank |
| 7,163,645 B2 | 1/2007 | Hanada |
| 7,163,646 B2 | 1/2007 | Hanada |
| 7,273,839 B2 | 9/2007 | Koetzle |
| 7,767,637 B2 | 8/2010 | Simandl |
| 7,833,959 B1 | 11/2010 | Koetzle |
| 7,858,685 B2 | 12/2010 | Barry |
| 8,092,715 B2 | 1/2012 | Howard |
| 8,354,042 B2 | 1/2013 | Howard |
| 9,260,595 B1 * | 2/2016 | Holcombe, Jr. ........ C08L 21/00 |
| 2002/0026881 A1 | 3/2002 | Ludwig |
| 2003/0050356 A1 | 3/2003 | Bogdan |
| 2003/0083220 A1 * | 5/2003 | Doyel .................... C11D 7/261 |
| | | 510/412 |
| 2003/0228997 A1 | 12/2003 | Doyel |
| 2004/0224870 A1 | 11/2004 | Doyel |
| 2005/0119403 A1 | 6/2005 | St. Clair |
| 2005/0268946 A1 | 12/2005 | Miles |
| 2006/0068112 A1 | 3/2006 | Chapman |
| 2006/0281855 A1 | 12/2006 | Garfield |
| 2008/0153970 A1 | 6/2008 | Salazar |
| 2010/0240573 A1 | 9/2010 | Zysman |
| 2010/0298479 A1 | 11/2010 | Barry |
| 2011/0140047 A1 | 6/2011 | Howard |
| 2011/0309287 A1 | 12/2011 | Chen |
| 2012/0010116 A1 | 1/2012 | Minor |

OTHER PUBLICATIONS

How to Select a Vapor Degreasing Solvent, Dow Chemical, Jul. 2000.
Development of New Products for Cleaning, Dupont, Barlett, Apr. 2011.
The Science of Precision & Electronics Cleaning, 3M, 2003.
Halogenated Solvents, World Enviromnent and Energy, 2011.
Thermally Conductive Insulators, JaBar, 2005.
Replacing Hap Solvents: Xylene and Toluene Nuts & Bolts, PCI, Apr. 2006.

* cited by examiner

N-PROPYL BROMIDE SOLVENT SYSTEMS

CROSS-REFERENCE TO RELATED APPLICATIONS

This application is a continuation application to U.S. patent application Ser. No. 14/468,443 filed Aug. 26, 2014, which has issued as U.S. Pat. No. 9,260,595, and is related to International Application No. PCT/US2015/046915 filed Aug. 26, 2015, both of which are incorporated herein by reference.

BACKGROUND

The present invention relates generally to the field of solvents. More particularly, the present invention relates to n-propyl bromide based solvent compositions and systems that have high solvency powers while maintaining desirable evaporation rates. Further, the solvent compositions and systems are preferably capable of dissolving polymers such, as synthetic rubber polymers. Furthermore, the solvent compositions and systems of the present invention are preferably classed as nonflammable combustible, or, minimally, as class IC flammable liquids are preferably safe and relatively environmentally friendly and have various uses.

Solvents are traditionally used for cleaning, degreasing, coating, and bonding or debonding and are frequently used in connection with ultrasonic cleaning and vapor cleaning. Solvent systems have been significantly restricted over the past couple of decades due to environmental and safety concerns. For example, it is highly preferred that solvents have a high flash point, have low toxicity, have little global warming potential, and produce or no hazardous air pollutants and VOCs. Further, stricter environmental controls, such a Europe, have necessitated no or low flammability, safer, and more environmentally-friendly solvents.

Further, the use of polymers such as synthetic rubber polymers is extensive. For example, synthetic rubber polymers are frequently used in adhesives, sealants, and coatings. Liquid formulations of synthetic rubber polymers have been used that incorporate high solvency solvents such as toluene, to dissolve the polymer to a liquid solvent system that incorporates both the solvent and the polymer. Known solvent compositions for dissolving such polymers, however, are highly flammable and have significant health and environmental concerns. Thus, the resulting liquid solvent systems are also flammable and have significant health and environmental concerns. Combustible and nonflammable materials are preferred for having less shipping/handling requirements compared with Flammable materials.

Thus, there is a need for a solvent composition and system that has high solvency power over a wide range of evaporation rates and is capable of dissolving polymers such as synthetic rubber polymers, and is nonflammable or has low flammability.

SUMMARY

The present invention includes a solvent system. In one embodiment of the invention, the solvent system includes a mixture having n-propyl bromide and a propionate containing liquid. Such a mixture may include approximately 35 to 92.5 weight percent propionate containing liquid and 7.5 to 65 weight percent n-propyl bromide. Alternatively, the mixture includes between 80 to 90 weight percent of a propionate containing liquid and between 10 to 20 weight percent n-propyl bromide. In another embodiment, the mixture includes between 65 to 75 weight percent of a propionate containing liquid and between 25 to 35 weight percent n-propyl bromide. In yet another embodiment, the mixture includes between 35 to 45 weight percent of a propionate containing liquid and between 55 to 65 weight percent n-propyl bromide.

In an alternative embodiment of the present invention, the solvent system includes a mixture having n-propyl bromide and a butyrate containing liquid. Such a mixture may include approximately 40 to 65 weight percent butyrate containing liquid and 15 to 60 weight percent n-propyl bromide. Alternatively, the mixture may include approximately 40 to 75 weight percent butyrate containing liquid and 25 to 60 weight percent n-propyl bromide. In yet another embodiment, the mixture may include approximately 40 to 70 weight percent butyrate containing liquid and 30 to 60 weight percent n-propyl bromide.

The solvent system may be nonflammable and preferably has a solvency power greater than 75 based upon its Kauri Butanol value. The solvency power is even more preferably greater than 100 based upon its Kauri Butanol value. Moreover, the solvent system may include a synthetic rubber, wherein the solvent mixture dissolves the synthetic rubber to form a liquid rubber. In one embodiment of the invention that includes a synthetic rubber, the solvent system includes approximately 30 to 50 weight percent propionate containing liquid. In another embodiment that includes synthetic rubber, the solvent system includes approximately 30 to 50 weight percent butyrate containing liquid.

The solvent system of the present invention may have a wide variety of uses including use as a liquid rubber agent, a paint carrier, a cleaning agent, a debonder, a bonding agent, or to reduce tarnishing on a metal surface. The solvent system may further include functional additives, such as a tackifier antioxidant UV-stabilizer, surfactants, plasticizers, dispersants, biocides, binders, suspenders, extenders, flame retardants, blocking agents, lubricants, rubber compounding agents, and plastic compounding agents. Additional additives that may be incorporated in the solvent system of the present invention include cellulosic, polyvinylpyrrolidone, and organo-clay. In one embodiment of the present invention the solvent system includes a nonflammable propellant for incorporation of the system into an aerosol can.

The present invention also includes a method of controlling the vaporization rate of n-propyl bromide. The method includes the steps of providing an n-propyl bromide liquid having a first vaporization rate and also providing a propionate containing liquid or a butyrate containing liquid. The method further includes the steps of combining the n-propyl bromide liquid with the propionate containing liquid or the butyrate containing liquid and adjusting the amounts of the propionate containing liquid or the butyrate containing liquid to obtain a second vaporization rate less than the first vaporization rate of the n-propyl bromide liquid.

Furthermore, the present invention includes a method of reducing the amount of n-propyl bromide in a solvent while maintaining solvency power. The method includes the steps of providing an n-propyl bromide liquid having a specified solvency power and also providing a propionate containing liquid or a butyrate containing liquid. The method further includes the steps of combining the propionate containing liquid or the butyrate containing liquid to the n-propyl bromide liquid and adjusting the amounts of the propionate containing liquid or the butyrate containing liquid to reduce the amount of n-propyl bromide liquid. Farther, the method includes the step of maintaining at least the specified solvency power of the n-propyl bromide.

DETAILED DESCRIPTION OF REPRESENTATIVE EMBODIMENTS

The present invention relates to solvent compositions and systems. More particularly, the present invention n-propyl bromide based solvents and systems that preferably have high flash points and are relatively environmentally friendly. Further, the solvent compositions of the present invention have high solvency rates and are preferably capable of dissolving polymers such as synthetic rubbers including styrene-block-copolymers. The components of the solvent compositions and systems of the present invention may also be varied to yield desired evaporation rates and drying times.

The solvent compositions and systems of the present invention may have various uses. For example, particular solvent compositions and systems may be used as cleaning agents, protectants, coatings, sealants, and/or adhesives. Moreover, as discussed above, the solvent compositions and systems of the present invention may be used to dissolve polymers such as styrene-block-copolymers and may incorporate such polymers for use as a liquid rubber agent, paint carrier, cleaning agent, debonder, and/or bonding-agent. Further, the solvent composition and polymer solvent system of the present invention may also be combined with various other components such as suspenders, binders, additives, propellants, and/or fillers for a myriad of additional uses.

The solvent compositions and systems of the present invention are related to the solvent compositions and systems of U.S. patent application Ser. No. 14/069,942 titled Miscible Solvent System and Method for Making Same and U.S. patent application Ser. No. 14/230,791 titled Nonflammable Solvent Compositions for Dissolving Polymers and Resulting Solvent Systems. These applications are incorporated herein by reference in their entirety.

Unless otherwise stated, the following terms used in the specification and claims have the meanings given below.

As used herein unless otherwise stated, the term "flash point" refers to the lowest temperature at which a material can vaporize to form an ignitable mixture in air.

As used herein unless otherwise state, the term "cloud point" refers to the composition at which combined components are no longer miscible and the composition becomes cloudy. The cloud point as used herein is determined at ambient temperature.

While various classifications and regulations may vary and differ in assessment and description of flammability and combustibility, below are flammability and combustibility classifications as used herein.

As used herein unless otherwise stated, the term "flammable" refers to liquid with a flash point less than about 100 degree Fahrenheit (38 degrees Celsius) when an ignition source is used. The designation of "flammable" herein therefore includes current Environmental Protection Agency (EPA) flammability classifications for Class IA 73 degrees Fahrenheit (23 degrees Celsius) and boiling point below 100 degrees Fahrenheit (38 degrees Celsius)), Class IB liquids (flash point below 73 degrees Fahrenheit (23 degrees Celsius) and boiling point at or above 100 degrees Fahrenheit (38 degrees Celsius)), and Class IC liquids (flash point at or above 73 degrees Fahrenheit (23 degrees Celsius) and below 100 degrees Fahrenheit (38 degrees Celsius)).

As used herein unless otherwise stated, the term "combustible" refers liquids with a flash point less than about 140 degrees Fahrenheit (60 degrees Celsius) but greater than about 100 degree Fahrenheit (38 degrees Celsius). The designation of "combustible" herein therefore includes current EPA flammability classifications for class II liquids (flash point at or above 100 degrees Fahrenheit (38 degrees Celsius) and below 140 degrees Fahrenheit (60 degrees Celsius)).

As used herein unless otherwise stated the term "nonflammable" refers liquids with a flash point greater than about 140 degrees Fahrenheit (60 degrees Celsius). The designation of "nonflammable" herein therefore includes current EPA flammability classifications for class III liquids including both class IIIA liquids (flash point at or above 140 degrees Fahrenheit (60 degrees Celsius) and below 200 degrees Fahrenheit (93 degrees Celsius)) and class IIIB liquids (flash point at or above 200 degrees Fahrenheit (93 degrees Celsius)).

The solvent positions and systems of present invention are generally composed of at least primary components: (1) n-propyl bromide and (2) a propionate and/or a butyrate. Further the solvent systems of the present invention may also include a polymer such as a synthetic rubber polymer and/or an acrylic polymer.

N-propyl bromide (CAS 106-94-5) also commonly called 1-bromopropane and denoted as n-PB and 1-BP, colorless liquid having a molecular formula $CH_3CH_2CH_2Br$ or $C_3H_7Br$. EnSolv CW™ is a band name readily available n-propyl bromide liquid made up of approximately 95 percent n-propyl bromide. N-propyl bromide has a low boiling point of 159 degrees Fahrenheit (71 degrees Celsius) and therefore has a fast evaporation and drying rate. N-propyl bromide is often reported as having no flash point thereby resulting in it being frequently classed as a nonflammable liquid. Further, n-propyl bromide has a Kauri-Butanol Value (KB value) of 125 and is capable of dissolving styrene block copolymers such as Styrene-Ethylene/Butylene-Styrene (SEBS) as well as acrylic polymers such as methyl methacrylate copolymer.

N-propyl bromide is widely used in industrial applications as a solvent and vapor cleaner. Because of n-propyl bromide's low boiling point and fast evaporation/dissolving drying rate, it is frequently ineffective at dissolving impurities when used alone as a cleaner. Furthermore, there are significant reported safety concerns regarding the use of n-propyl bromide. For example, it has been reported that excessive exposure to n-propyl bromide can cause eye, airway, and skin irritation as well as damage to the nervous system. Further, n-propyl bromide is being considered for classification as a human carcinogen and has been listed as a hazardous substance because of potential links to neurological illnesses in humans as well as cancer and reproductive disorders in animals.

Various propionates and butyrates may be used in the solvent compositions and systems of the present invention. Example propionates include but are not limited amyl propionate (CAS 105-68-0) and hexyl propionate (CAS 2445-76-3). Isoamyl propionate (IAP) has a chemical formula of $C_8H_{16}O_2$, a flash point of 118 degrees Fahrenheit (48 degrees Celsius), and a boiling point of 321 degrees Fahrenheit (160 degrees Celsius). Hexyl propionate (HP) has a chemical formula of $C_9H_{18}O_2$, a flash point of 149 degrees Fahrenheit (65 degrees Celsius), and a boiling point of 356 degrees Fahrenheit (180 degrees Celsius).

Example butyrates include, but re not limited to, isoamyl butyrate (CAS 106-27-4), amyl butyrate (CAS 540-18-1), n-butyl n-butyrate (CAS 109-21-7), isoamyl isobutyrate (CAS 2050-01-3), and amyl isobutyrate (CAS 2445-72-9). Isoamyl butyrate (IAB) has a chemical formula of $C_9H_{18}O_2$, a flash point of 138 degrees Fahrenheit (58 degrees Celsius), and a boiling point of 372 degrees Fahrenheit (189 degrees Celsius). Amyl butyrate (AB) has a chemical formula of $C_9H_{18}O_2$, a flash point of 133 degrees Fahrenheit (56 degrees Celsius), and a boiling point of 370 degrees Fahrenheit (188 degrees Celsius). N-butyl n-butyrate (nBnB) has chemical formula of $C_8H_{16}O_2$, a flash point of 127 degrees Fahrenheit (53 degrees Celsius), and a boiling point of 327 degrees Fahrenheit (164 degrees Celsius). Isoamyl isobutyrate (IAIB) has a chemical formula of $C_{18}H_{36}O_4$, a flash point of 129 degrees Fahrenheit (54 degrees Celsius), and a boiling point of 340 degrees Fahrenheit (171 degrees Celsius). Amyl isobutyrate (AIB) has a chemical formula of $C_9H_{18}O_2$, flash point of 133 degrees Fahrenheit (56 degrees Celsius), and a boiling point of 340 degrees Fahrenheit (171 degrees Celsius).

The propionates and butyrates of the present invention may be incorporated in their pure form wherein 100 percent of the liquid is a propionate and/or butyrate. Frequently, however, small amounts of additives are incorporated in a propionate or butyrate containing liquid. Most propionate or butyrate containing liquids, however, include at least 90 weight percent of the respective propionate or butyrate. Preferably, the propionate or butyrate containing liquids include at least 95 weight percent of the respective propionate or butyrate. Even more preferably, the propionate a butyrate containing liquids include at least 98 or 99 weight percent of the respective propionate or butyrate.

Mixtures and combinations of the above propionates and butyrates may be used without departing from the spirit and the scope of the present invention. Furthermore the above propionates and/or butyrates may be combined or mixed with other propionates and/or butyrates such as allyl propionate (CAS 2408-20-0), butyl propionate (CAS 590-01-2), n-propyl propionate (CAS 106-36-5), isobutyl propionate (CAS 540-42-1), tert-butyl propionate (CAS 20487-40-5), ethyl propionate (CAS 105-37-3), methyl propionate (CAS 554-12-1), propyl propionate (CAS 637-78-5), ethyl 3-ethoxypropionate (CAS 763-69-9), ethyl 2-hydroxypropionate (CAS 97-64-3), ethyl 2-hydroxypropionate (CAS 687-47-8), ethyl butyrate (CAS 105-54-4), methyl n-butyrate (CAS 623-42-7), and propyl butyrate CAS 105-66-8).

In one embodiment of the present invention, the solvent system includes a miscible solvent mixture having between 35 to 92.5 percent of a propionate containing liquid and between 7.5 to 65 weight percent n-propyl bromide. In another embodiment of the present invention, the solvent system includes a miscible solvent mixture having between 80 to 90 weight percent of a propionate containing liquid and between 10 to 20 weight percent n-propyl bromide. In yet another embodiment, the solvent system includes a miscible solvent mixture having approximately 85 weight percent of a propionate containing liquid and approximately 15 weight percent n-propyl bromide. Alternatively in one embodiment of the present invention, the solvent system includes a miscible solvent mixture having between 65 to 75 weight percent of a propionate containing liquid and between 25 to 35 weight percent n-propyl bromide. In another embodiment, the solvent system includes a miscible solvent mixture having approximately 70 weight percent of a propionate containing liquid and approximately 30 weight percent n-propyl bromide. In yet another embodiment of the present invention, the solvent system includes a miscible solvent mixture having between 35 to 45 weight percent of a propionate containing liquid and between 55 to 65 weight percent n-propyl bromide. In yet another embodiment, the solvent system includes a miscible solvent mixture having approximately 40 weight percent of a propionate containing liquid and approximately 60 weight percent n-propyl bromide. Hexyl propionate is a particularly suitable propionate in the above disclosed embodiments.

Further, the mixture may have a Kauri-Butanol solvency power greater than 75. Alternatively, the mixture may have Kauri-Butanol solvency power greater than 100. The solvent mixture is preferably nonflammable, combustible, or minimally a class IC flammable liquid. Further, the solvent system may include a nonflammable propellant for incorporating the system into an aerosol can. Further the solvent system may include additives such as a cellulosic, polyvinylpyrrolidone, and/or organo-clay.

In another embodiment of the present invention, the solvent system includes a miscible solvent mixture having between 40 to 85 weight percent of a butyrate containing liquid and between 15 to 60 weight percent propyl bromide. Alternatively, the miscible solvent mixture has between 40 to 75 weight percent of a butyrate containing liquid and between 25 to 60 weight percent n-propyl bromide. In such an embodiment, amyl butyrate may be the butyrate included in the solvent mixture. In yet another embodiment, the miscible solvent mixture has between 40 to 70 weight percent of a butyrate containing liquid and between 30 to 60 weight percent n-propyl bromide. In such an embodiment, n-butyl n-butyrate may be the butyrate included in the solvent mixture. The mixture may have a Kauri-Butanol solvency power greater than 75. Alternatively, the mixture may have a Kauri-Butanol solvency power greater than 100. The solvent mixture is preferably nonflammable, combustible, or minimally a class IC flammable liquid. Further, the solvent system may include a nonflammable propellant for incorporating the system into an aerosol can. Further, the solvent system may include additives such as a cellulosic, polyvinylpyrrolidone, and/or organo-clay.

The solvent compositions and systems of the present invention may have various uses such as use as a cleaning agent or a debonder. Further, as discussed above, the solvent compositions and systems may be combined with a nonflammable propellant. Example propellants include HFC 134A propellant or HFO-1234ze. The solvent compositions and/or systems of the present invention when combined with a nonflammable propellant and inserted into an aerosol can are often capable of spraying on most substrates. Further, the resulting aerosol sprays frequently include the added benefits of being nonflammable combustible, or minimally a class IC flammable liquid.

The solvent system of the present invention may also include polymers such as a synthetic rubber polymer for dissolving into the solvent mixture to form a liquid rubber composition. A variety of polymers may be used in the solvent system. For example, in one embodiment, a styrene block copolymer such as Styrene-Ethylene/Butylene-Styrene (SEBS) may be used. Several suitable styrene polymers are sold under the brand name Kraton™ such as Kraton G1652, Kraton G1643 (CAS 66070-58-4), and Kraton FG-1901. These styrene polymers are highly versatile and are typically in the form of synthetic rubber materials including resins, powders, and pellets. Styrene polymer may be combined with a solvent composition at approximately 1 through 50 weight percent of the solvent system. In another embodiment, the styrene polymer may be combined with a solvent composition at approximately 10 through 40 weight percent of the solvent system. In yet another embodiment, the styrene polymer may be combined with a solvent composition at approximately 20 through 30 weight percent of the solvent system. In a further embodiment, the styrene polymer may be combined with a solvent composition at approximately 5 through 25 weight percent of the solvent system. One example of the solvent system of the present invention that incorporates SEBS, includes 51 weight percent n-propyl bromide, 34 weight percent hexyl propionate, and 15 weight percent SEBS, such as Kraton FG-1901 polymer powder.

Alternatively, the solvent composition of the present invention may be combined with a methyl methacrylate copolymer to create the solvent system of the present invention. Methyl methacrylate copolymer (CAS 9011-14-7) has a chemical formula of $C_5H_8O_2X_2$. Paraloid B48N also known as Acryloid B48N, is an example of a methyl methacrylate copolymer that is suitable for use in the present invention. Paraloid B48N may be in the form of powder, pellets, or sheets and is typically hard and abrasion resistant. Methyl methacrylate copolymer may be combined with a solvent composition at approximately 1 through 50 weight percent of the solvent system. In another embodiment, methyl methacrylate copolymer may be combined with a solvent composition at approximately 10 through 40 weight percent of the solvent system. In yet another embodiment, the methyl methacrylate copolymer may be combined with a solvent composition at approximately 20 through 30 weight percent of the solvent system. In a further embodiment, the methyl methacrylate copolymer may be combined with a solvent composition at approximately 5 through 25 weight percent of the solvent system. One example of the solvent system of the present invention that incorporates methyl methacrylate polymer, includes 48 weight percent n-propyl bromide, 32 weight percent hexyl propionate, and 20 weight percent methyl methacrylate copolymer, such as Paraloid B48N.

In one embodiment contain in polymer, the system includes 30 to 50 weight percent of a propionate containing liquid. In an alternative embodiment containing a polymer, the system includes 30 to 50 weight, percent of a butyrate containing liquid. The solvent system containing a polymer, such as a synthetic rubber, may be used to form a liquid rubber that has many uses. For example, the system may be used as a liquid rubber agent, a paint carrier, a tarnish reducer, or a bonding agent containing a polymer material, such as styrene block copolymer. The solvent system may also include functional additives such as tackifiers, antioxidants, UV-stabilizers, surfactants, plasticizers, dispersants, biocide binders, suspenders, extenders, flame retardants, blocking agents, lubricants, rubber compounding agents, and plastic compounding agents.

The solvent compositions and systems of the present invention may also be combined with other solvents and components to vary the boiling point of the solvent system and thereby increase or decrease the evaporation rate of the system. For example, parachlorobenzotrifluoricle (PCBTF), which is an organic chemical compound with the molecular formula $C_7H_4ClF_3$, may be blended with the solvent system. Incorporation of PCBTF into the solvent system may, however, lower the solvency power of the system because the KB value of PCBTF is only 64. Alternatively, tert-butyl acetate (Tbac) may be incorporated into the solvent system. While useful for varying the evaporation rate of a solvent system the addition of components and solvents may detrimentally affect the flash point and flammability classification of the system.

The present invention also includes a method for controlling the vaporization rate of n-propyl bromide. For example, the method includes the steps of providing an n-propyl bromide liquid having a first vaporization rate and also providing a propionate containing liquid or a butyrate containing liquid. The method further includes the steps of combining the n-propyl bromide liquid with either the propionate containing liquid or the butyrate containing liquid and adjusting the amounts of the propionate containing liquid or the butyrate containing liquid to obtain a second desired vaporization rate. The second vaporization rate of the combined mixture is preferably less than the first vaporization rate of the n-propyl bromide containing liquid.

The present invention further includes a method for reducing the amount of n-propyl bromide in a solvent while maintaining solvency power. For example, the method includes the steps of providing an n-propyl bromide liquid having a specified solvency power and providing a propionate containing liquid or a butyrate containing liquid. The method further includes the steps of combining the propionate containing liquid or the butyrate containing liquid to the n-propyl bromide liquid and adjusting the amounts of the propionate containing liquid or the butyrate containing liquid to reduce the amount of n-propyl bromide liquid. A specified solvency power is preferably maintained.

Having generally described this instant disclosure, a further understanding can be obtained by reference to certain specific examples illustrated below which are provided for purposes of illustration only and are not intended to be all inclusive or limiting unless otherwise specified.

TESTING & EXAMPLES

The preparation, identification, and testing of example compositions and systems of this disclosure are further described below. The particular materials and amounts thereof recited in these examples, as well as other conditions and detail should not be construed to unduly limit this invention. In these examples, all percentages, proportions and ratios are by weight unless otherwise indicated.

Figure 1:
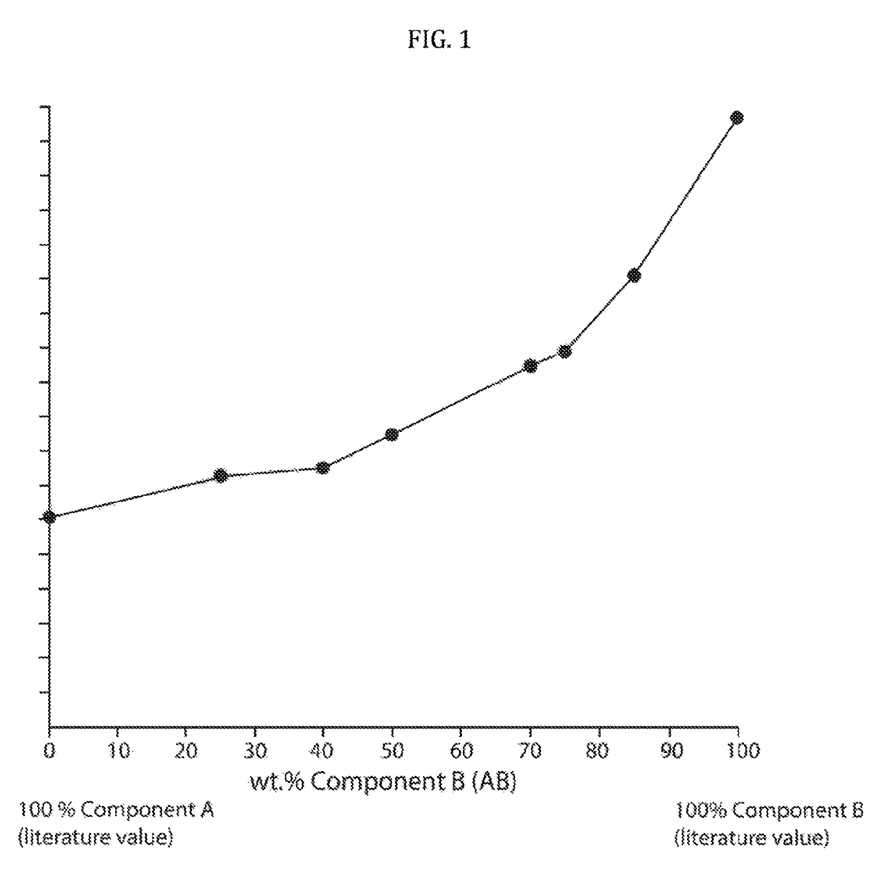
FIG. 1 is a schematic diagram of boiling point versus percent concentration of amyl butyrate and n-propyl bromide.
Figure 2:
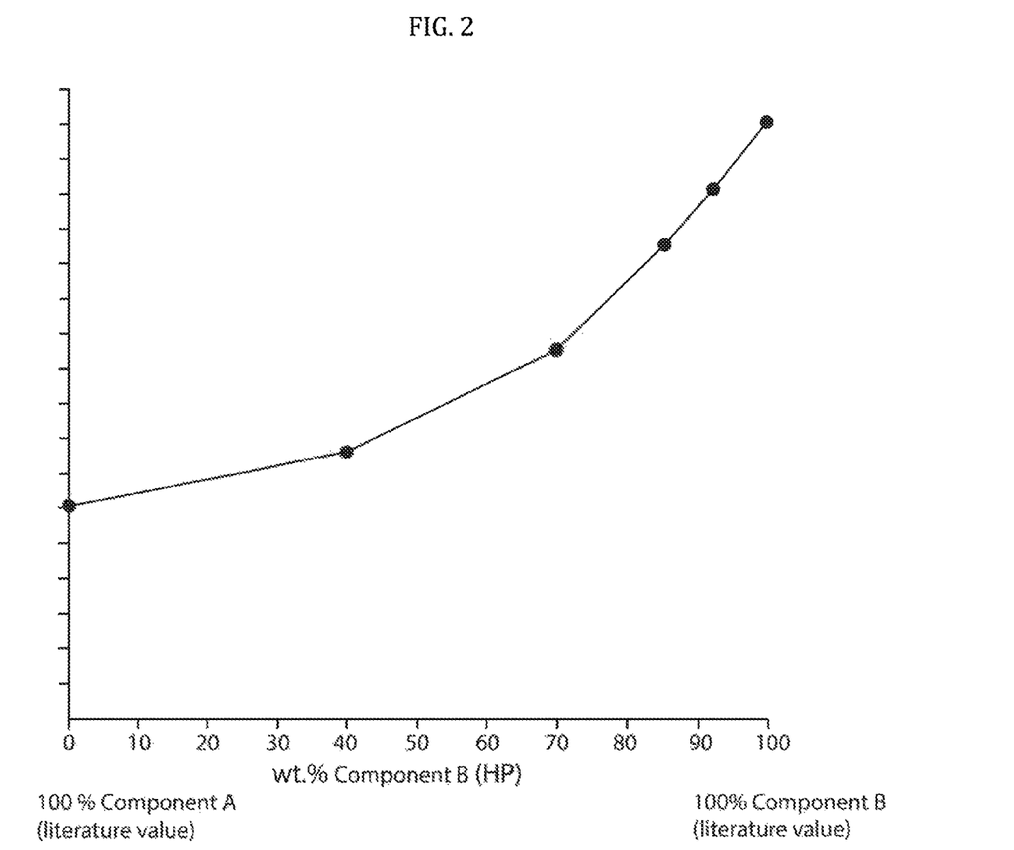
FIG. 2 is a schematic diagram of boiling point versus percent concentration of hexyl propionate and n-propyl bromide.
Figure 3:
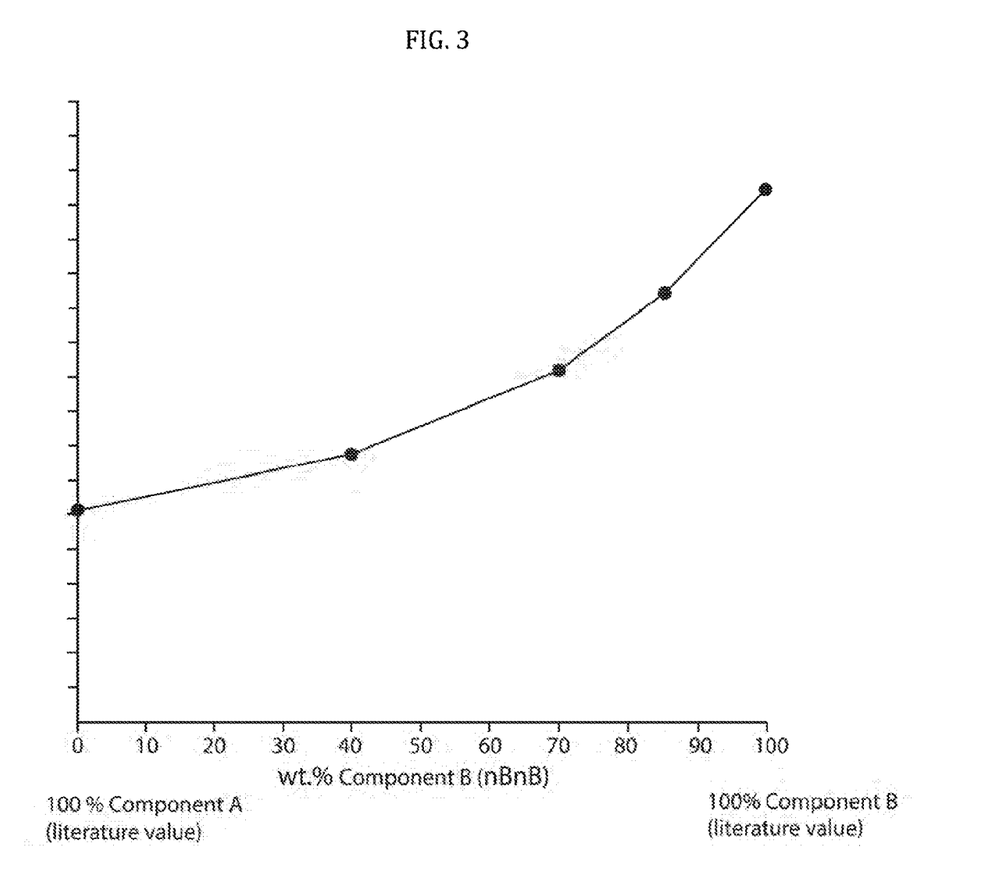
FIG. 3 is a schematic diagram of boiling point versus percent concentration of n-butyl n-butyrate and n-propyl bromide.

Selection of a particular propionate or butyrate as well as the amount of n-propyl bromide frequently depends on the desired evaporation/drying rate. Thus, the boiling points of compositions having bus concentrations of a n-propyl bromide component and a propionate or butyrate component were determined. FIGS. 1 through 3 disclose schematic diagrams of boiling points of such solvent compositions of the present invention. Tables I through III disclose the compositions used to generate FIGS. 1 through 3. A desirable boiling point for any applications of a solvent composition is typically in the range of 80 to 130 degrees Celsius or more preferably in the range of 80 to 120 degrees Celsius. Except as stated below, the boiling points were measured by Galbraith Labs using ASTMD110-11 standards and as set forth herein. The components of the solvent systems were combined at the designated weight percent concentration so that the compositions were miscible in all proportions. The compositions were distilled at ambient pressure (720 to 740 torr) in a concentric tube distillation column and then allowed to equilibrate at total reflux for at least 60 minutes. The boiling point of each distillate was measured using a thermocouple.

Selection of a particular propionate and/or butyrate as well as the amount of n-propyl bromide may also depend on the desired solvency power. Solvency power is typically measured by the Kauri-Butanol Value (KB value) of the solvent. Tables I through III below also disclose the KB values of certain solvent compositions of the present invention. The KB value is a measure of solvency power whereby the higher the KB value, the higher the solvency power. KB values were measured using standard techniques such as shown in ASTM D 1133. The dissolving power of each solvent was tested by dissolving Kauri resin and then the dissolvability of the solvents were compared. A solvent having a KB value between 10-20 is typically considered a mild solvent while a solvent having a KB value above 75 is typically considered a strong solvent. Further, solvents having a KB value over 100 are typically considered powerful solvents. Toluene, which has a KB value of 105, is a known flammable composition that is often used to dissolve styrene polymers.

In FIGS. 1 through 3, Ensolv CW™ was the brand of n-propyl bromide used and is denoted as Component A. As discussed above, Ensolv CW™ is a readily available n-propyl bromide liquid made up of approximately 95 percent n-propyl bromide Various propionates and butyrates are denoted as Component B. At zero percent on, the diagram, the composition is entirely Component A, and the boiling point equals that of n-propyl bromide, which has a listed boiling point of 71 degrees Celsius. At 100 percent on the diagram, the composition is entirely Component B and would therefore equal the boiling point of the particular propionate or butyrate. The boiling points of 100 percent of a component were not tested and instead were taken from readily available Material Safety Data Sheets (MSDS) and related literature on the particular components.

FIG. 1 is a schematic diagram of boiling point versus percent concentration of Ensolv CW™ n-propyl bromide (EN-CW n-PB) and Amyl Butyrate (AB). All tested concentrations were miscible in all proportions. Table I shows the exact compositions and measurements used to generate FIG. 1. As disclosed in FIG. 1 and Table I, concentrations of EN-CW n-PB and AB in a range of at least 25 to 75 weight percent EN-CW n-PB and 25 to 75 weight percent AB have a boiling point range between 81.6 and 118.36 degrees Celsius, which, as discussed above, are desirable boiling points for many applications of a solvent composition. Further, no flash was observed in the solvent compositions at or below a concentration of 75 weight percent AB. Thus, a nonflammable solvent composition was created over a wide range of AB concentrations while maintaining desirable evaporation/drying rates. Further, because AB was also particularly good at dissolving SEBS polymer, the KB value of certain of the below concentrations also determined. As shown below, the solvent compositions combining AB and n-PB had particularly high solvency power of approximately 132 to 135.

TABLE I

| % Component A (EN-CW n-PB) | % Component B (AB) | KB Value | Boiling Point ° C. | Flash Point ° F./° C. |
|---|---|---|---|---|
| 100% | 0% | 125 | 71 | No Flash |
| 75% | 25% | — | 81.6 | No Flash |

TABLE I-continued

| % Component A (EN-CW n-PB) | % Component B (AB) | KB Value | Boiling Point ° C. | Flash Point ° F./° C. |
|---|---|---|---|---|
| 60% | 40% | 134.31 | 86.3 | No Flash |
| 50% | 50% | — | 95.3 | No Flash |
| 30% | 70% | 133.36 | 114.6 | No Flash |
| 25% | 75% | — | 118.3 | No Flash |
| 15% | 85% | 132.01 | 140.6 | 95/35 |
| 0% | 100% | 134.19 | 188 | 133/56.1 |

Further, xylene, toluene, and plastidip solvents are flammable chemical compositions that be used in connection with styrene block copolymers and other polymers. Xylene has a boiling point of approximately 139 degrees Celsius, toluene has a boiling point of approximately 111 degrees Celsius, and PlastiDip mixed solvents (combination of CAS 64742-48-9, CAS 110-54-3 CAS 108-88-3, and CAS 78-93-3) have a boiling point of approximately 88 degrees Celsius. Furthermore, standard vapor cleaner used as aerosol-can carriers/vehicles typically have boiling points of approximately 60-65 degrees Celsius. As shown in Table I above, the solvent composition at 85 weight percent AB and 15 weight percent EN-CW n-PB has a boiling point similar to Xylene, at 70 weight percent AB and 30 weight percent EN-CW n-PB has a boiling point similar to toluene, and at 40 weight percent AB and 60 weight percent EN-CW n-PB has a boiling point similar to PlastiDip.

FIG. 2 is a schematic diagram of boiling point versus percent concentration of Hexyl Propionate (HP) and EN-CW n-PB. All tested concentrations were miscible in all proportions. Table II shows the exact compositions and measurements used to generate FIG. 2. As disclosed in FIG. 2 and Table II, concentrations of EN-CW n-PB and HP in a range of at least 30 to 60 weight percent EN-CW n-PB and 40 to 70 fight percent HP have a boiling point range between 86.6 and 114.9 degrees Celsius, which, as discussed above, a desirable boiling points for many applications of a solvent composition. Further no flash was observed in the combined solvent compositions. Thus, a nonflammable solvent composition was created over a wide range of HP concentrations while maintaining desirable evaporation/drying rates. Further because HP was also particularly good at dissolving SEBS polymer, the KB value of certain of the below concentration also determined. As shown below, the solvent compositions combining HP and n-PB had particularly high solvency power of approximately 132 to 134.

TABLE II

| % Component A (EN-CW n-PB) | % Component B (HP) | KB Value | Boiling Point ° C. | Flash Point ° F./° C. |
|---|---|---|---|---|
| 100% | 0% | 125 | 71 | No Flash |
| 60% | 40% | 133.69 | 86.6 | No Flash |
| 30% | 70% | 132.53 | 114.9 | No Flash |
| 15% | 85% | 133.11 | 145.9 | No Flash |
| 7.5% | 92.5% | — | 161.9 | No Flash |
| 0% | 100% | 127.11 | 180 | 149/65 |

As shown in Table II above, the solvent composition at 85 weight percent HP and 15 weight percent EN-CW n-PB has a boiling point similar to Xylene, at 70 weight percent HP and 30 weight percent EN-CW n-PB has a boiling point similar to toluene, and at 40 weight percent HP and 60 weight percent EN-CW n-PB has a boiling point similar to PlastiDip.

FIG. 3 is a schematic diagram of boiling point versus percent concentration of n-Butyl n Butyrate (nBnB) and EN-CW n-PB. All tested concentrations were miscible in all proportions. Table III shows the compositions and measurements used to generate FIG. 3. As disclosed in FIG. 3 and Table III, concentrations of EN-CW n-PB and nBnB in a range of at least 30 to 60 weight percent EN-CW n-PB and 40 to 70 weight percent nBnB have a boiling point range between 86.6 and 112.9 degrees Celsius, which, as discussed above are desirable boiling points for many applications of a solvent composition. Further, no flash was observed in the solvent compositions at or below a concentration of 70 weight percent nBnB. Thus, a nonflammable solvent composition was created over a wide range of nBnB concentration while maintaining desirable evaporation/drying rates. Further, because nBnB was particularly good at dissolving SEBS polymer, the KB value of certain of the below concentrations was also determined. As shown below, the solvent compositions combining nBnB and n-PB had the highest solvency power of approximately 140 to 148.

TABLE III

| % Component A (EN-CW n-PB) | % Component B (nBnB) | KB Value | Boiling Point ° C. | Flash Point ° F./° C. |
|---|---|---|---|---|
| 100% | 0% | 125 | 71 | No Flash |
| 60% | 40% | 140.95 | 86.6 | No Flash |
| 30% | 70% | 146.17 | 112.9 | No Flash |
| 15% | 85% | 147.43 | 134.9 | 95/35 |
| 0% | 100% | 163.04 | 164 | 127/52.8 |

As shown in Table III above, the solvent composition at 85 weight percent nBnB and 15 weight percent EN-CW n-PB has a boiling point similar to Xylene, at 70 weight percent nBnB and 30 weight percent EN-CW n-PB has a boiling point similar to toluene, and at 40 weight percent nBnB and 60 weight percent EN-CW n-PB has a boiling point similar to PlastiDip.

As discussed above, the solvent compositions of the present invention may be used for many applications and determination of the particular components and ranges of components of the solvent composition typically depends on the particular use of the composition. For example, one composition may have properties better suited for use as a cleaning agent while a different composition may have properties better suited for mixing with concentrated paints or coatings to act as a carrier for such concentrated paints or coatings. Further, certain compositions may be used bonding agent while other compositions may be used as a debonder. Moreover, one composition may have properties better suited for dissolving a particular polymer, such as those discussed herein and including styrene polymers.

Further, selection of a particular propionate or butyrate as well as the amount of n-propyl bromide frequently depends on the desired evaporation/drying rate. For example and as shown by the above tables, if faster drying time is desired, a higher quantity of n-propyl bromide is typically incorporated into the composition and system. In contrast, if slower drying time is desired, a lower quantity of n-propyl bromide is typically incorporated into the composition and system.

While the pure butyrates and propionates disclosed above have high boiling points, which therefore leads to very low evaporation and slow drying rates for, the solvents, mixing with n-propyl bromide significantly lowers the boiling points and therefore allows for tailoring of a particular desirable evaporation/drying rate as well as a particular desirable solvency power. Further, a broad range, of non-flammable or combustible compositions are achievable by varying the amount of n-propyl bromide as well as with the particular selection of propionates and butyrates, including combinations thereof.

Moreover because the drying/evaporation rate and actual vaporization rate will also vary depending on the heat of vaporization and cohesive energy density, a blend of the above solvents and components may achieve highly desirable drying characteristics. For example, a triple-blend of the above solvents may result in practically any polymer-content dissolution and drying rate that is needed for a particular application.

The present invention also relates to solvent systems that incorporate polymers such as synthetic rubber polymers including Styrene-Ethylene/Butylene Styrene (SEBS). As discussed in U.S. patent application Ser. No. 14/230,126, several propionates and butyrates are capable of dissolving polymers and synthetic rubbers such as SEBS. Further, it was discussed that several propionates and butyrates when combined with particular fluorinated solvents are also capable of dissolving polymers and synthetic rubber. It has likewise been determined that several propionates and butyrates when combined with n-propyl bromide are also capable of dissolving polymers and synthetic rubbers such as SEBS. Indeed, as set forth in Table IV below, which compares KB values of various solvents, n-propyl bromide combined with propionates and/or butyrates have even higher solvency powers than most fluorinated solvents combined with propionates and/or butyrates as disclosed in U.S. patent application Ser. No. 14/230,126. Table IV also includes boiling point and flash point data for comparative purposes.

In the table below, Novec 72DE refers to a fluorinated solvent having a mixture of HFEs, including ethyl nonafluorobutyl ether ($C_6H_5F_9O$), ethyl nonafluoroisobutyl ether ($C_6H_5F_9O$), methyl nonafluorobutyl ether ($C_5H_3F_9O$), and methyl nonafluoroisobutyl ether ($C_5H_3F_9O$) and includes t-DCE, also known as 1,2-dichloroethene. More particularly Novec 2DE includes approximately 68 through 72 weight percent t-DCE, approximately 4 through 16 weight percent ethyl nonafluorobutyl ether, approximately 4 through weight percent ethyl nonafluoroisobutyl ether, approximately 2 through 8 percent methyl nonafluorobutyl ether, and approximately 2 through 8 percent methyl nonafluoroisobutyl ether. Novec 7100 refers to a mixture of methyl nonafluoroisobutyl ether and methyl nonafluorobutyl ether, which is also known as HFE 7100, PCBTF refers to parachlorobenzotrifluoricle, which is an organic chemical compound with the molecular formula $C_7H_4ClF_3$. Oxsol 100™ is a brand name of a commonly sold PCBTF.

TABLE IV

| Solvent Composition | KB Value | Boiling Point ° C. | Flash Point ° F. |
|---|---|---|---|
| N-Propyl Bromide Based Compositions | | | |
| 40% AB + 60% n-PB | 134.31 | 86 | No Flash |
| 70% AB + 30% n-PB | 133.36 | 115 | No Flash |
| 85% AB + 15% n-PB | 132.01 | 141 | 95 |
| 40% HP + 60% n-PB | 133.69 | 87 | No Flash |
| 70% HP + 30% n-PB | 132.53 | 115 | No Flash |
| 85% HP + 15% n-PB | 133.11 | 146 | No Flash |
| 40% nBnB + 60% n-PB | 140.95 | 87 | No Flash |
| 70% nBnB + 30% n-PB | 146.17 | 113 | No Flash |
| 85% nBnB + 15% n-PB | 147.43 | 135 | 95 |

TABLE IV-continued

| Solvent Composition | KB Value | Boiling Point ° C. | Flash Point ° F. |
|---|---|---|---|
| Novec 72DE/Fluorinated Solvent Based Compositions | | | |
| 90% AB + 10% Novec 72DE | 114.98 | 134 | 102 |
| 80% AB + 20% Novec 72DE | 105.67 | 114 | No Flash |
| 65% AB + 35% Novec 72DE | 86.85 | 87 | No Flash |
| 40% AB + 60% Novec 72DE | 69.49 | 66 | No Flash |
| 90% HP + 10% Novec 72DE | 115.92 | 136 | 106 |
| 80% HP + 20% Novec 72DE | 84.52 | 111 | No Flash |
| 65% HP + 35% Novec 720E | 91.51 | 99 | No Flash |
| 40% HP + 60% Novec 72DE | 68.23 | 65 | No Flash |
| 90% nBnB + 10% Novec 72DE | 147.56 | 131 | 98 |
| 80% nBnB + 20% Novec 72DE | 116.90 | 111 | No Flash |
| 65% nBnB + 35% Novec 72DE | 112.54 | 90 | No Flash |
| 40% nBnB + 60% Novec 72DE | 82.95 | 66 | No Flash |
| Comparative Solvent | | | |
| 100% n-PB | 125 | 71 | No Flash |
| 100% AB | 134.19 | 188 | 133 |
| 100% HP | 127.11 | 180 | 149 |
| 100% nBnB | 163.04 | 164 | 127 |
| Xylene | 98 | 139 | 77 |
| PCBTF | 64 | 139 | 109 |
| Toluene | 105 | 111 | 40 |
| Tert-butyl acetate (Tbac) | 114 | 98 | 40-60 |
| Heptane | 28 | 98 | 25 |
| Naphtha | 34-36 | 86 | 50 |
| Hexane | 29 | 68 | -8.5 |
| Novec 7100 | 10 | 61 | No Flash |

It is apparent from Table IV above that the solvent compositions of the present invention are capable of having very high solvency power that can be tailored depending on a particular use, while maintaining nonflammable or combustible properties up to a very high concentration of AB, HP, nBnB, and n-PB.

Indeed as shown in Table V below, which reorganizes the above solvents based upon similar boiling points, the solvent compositions and systems of the present invention provide nonflammable or low flammability and high solvency power alternatives to known highly flammable solvents over a wide range of evaporation rates. Particularly, the present invention discloses several xylene-like compositions, toluene-like compositions, tert-butyl acetate or Tbac-like compositions, and even vapor-cleaning-like compositions. Within each group of Table V, the compositions are listed based upon KB value with the highest KB value composition listed first and the comparative solvent listed in bold.

TABLE V

| Solvent Composition | KB Value | Boiling Point (BP) ° C. | Flash Point ° F. |
|---|---|---|---|
| Xylene-like Evaporation Rate Compositions (BP +/- 8° C.) | | | |
| 90% nBnB + 10% Novec 72DE | 147.56 | 131 | 98 |
| 85% nBnB + 15% n-PB | 147.43 | 135 | 95 |
| 85% HP + 15% n-PB | 133.11 | 146 | No Flash |
| 85% AB + 15% n-PB | 132.01 | 141 | 95 |
| 90% HP + 10% Hovec 72DE | 115.92 | 136 | 106 |
| 90% AB + 10% Novec 72DE | 114.98 | 134 | 102 |
| Xylene | 98 | 139 | 77 |
| PCBTF | 64 | 139 | 109 |
| Toluene-like Evaporation Rate Compositions (BP +/- 7° C.) | | | |
| 70% nBnB + 30% n-PB | 146.17 | 113 | No Flash |
| 70% AB + 30% n-PB | 133.36 | 115 | No Flash |
| 70% HP + 30% n-PB | 132.53 | 115 | No Flash |
| 80% nBnB + 20% Novec 72DE | 116.90 | 111 | No Flash |
| 80% AB + 20% Novec 72DE | 105.67 | 114 | No Flash |
| Toluene | 105 | 111 | 40 |
| 80% HP + 20% Novec 72DE | 84.52 | 111 | No Flash |
| Tbac-like Evaporation Rate Compositions (BP +/- 6° C.) | | | |
| Tbac | 114 | 98 | 40-60 |
| Heptane | 28 | 98 | 25 |
| 65% HP + 35% Novec 72DE | 91.51 | 99 | No Flash |
| PlastiDip-like Evaporation Rate Compositions (BP +/- 5° C.) | | | |
| 40% nBnB + 60% n-PB | 140.95 | 87 | No Flash |
| 40% AB + 60% n-PB | 134.31 | 86 | No Flash |
| 40% HP + 60% n-PB | 133.69 | 87 | No Flash |
| 65% nBnB + 35% Novec 72DE | 112.54 | 90 | No Flash |
| 65% AB + 35% Novec 72DE | 86.85 | 87 | No Flash |
| Naphtha | 34-36 | 86 | 50 |
| PlastiDip | — | 88 | 54 |
| Vapor Cleaner-like Evaporation Rate Compositions (BP +/- 6° C.) | | | |
| 100% n-PB | 125 | 71 | No Flash |
| 40% nBnB + 60% Novec 72DE | 82.95 | 66 | No Flash |
| 40% AB + 60% Novec 72DE | 69.49 | 66 | No Flash |
| 40% HP + 60% Novec 72DE | 68.23 | 65 | No Flash |
| Hexane | 29 | 68 | -8.5 |
| Novec 7100 | 10 | 61 | No Flash |
| Standard Vapor Cleaner | — | 60-65 | — |

Tests were also performed using HP and n-propyl bromide solvent compositions and various polymers, wherein tackifying resin, such as Eastotac H-100W Resin, which is a hydrogenated hydrocarbon resin, may be used if desired. For example, a solvent composition having 40 weight percent HP and 60 weight percent n-propyl bromide was combined with SEBS polymer powder, specifically Kraton FG-1901 polymer powder. The system proportions were 51 weight percent n-propyl bromide, 34 weight percent hexyl propionate, and 15 weight percent Kraton FG-1901 polymer powder. The polymer completely dissolved without shear in the HP and n-propyl bromide to create a solvent system incorporating the styrene polymer. Further, because the polymer completely dissolved in the 40/60 blend of HP and n-propyl bromide, the films of the solvent system incorporating the styrene polymer can also be removed using the 40/60 blend of HP and n-propyl bromide. Further, the 40/60 blend of HP and n-propyl bromide was also combined with methyl methacrylate copolymer, specifically Paraloid B48N. The system proportions were 48 weight percent n-propyl bromide, 32 weight percent hexyl propionate, and 20 weight percent Paraloid B48N. The polymer completely dissolved without shear in the HP and n-propyl bromide to create a solvent system incorporating the methyl methacrylate copolymer. Further, because the polymer completely dissolved in the 40/60 blend of HP and n-propyl bromide, the films of the solvent system incorporating the methyl methacrylate copolymer can also be removed using the 40/60 blend of HP and n-propyl bromide.

Both solvent systems were nonflammable and formed clear liquids. Further, both systems were coated onto aluminum coupons to create a thin polymer film on the coupon. The polymer films dried onto the aluminum coupons in approximately three hours at ambient/room-temperature (approximately 21 degrees Celsius). This time may be accelerated by placing the coupons in a dryer at 60 degrees Celsius for approximately one hour or by using a traditional hair dryer set on high heat and low fan speed for approximately 3 through 5 minutes. A solvent composition having approximately 40 weight percent HP and 60 weight percent n-propyl bromide was then applied to the film after drying. Both films were removed from the aluminum coupon in approximately one minute.

While the polymer films were transparent, traditional pigments and colorants may be added to the systems to provide coloring for the films. In one embodiment, titanium oxide may be added to create a white film, which assists with visual clarity of complete film application to substrate as well as removal from the substrate. Further, the methyl methacrylate copolymer solvent system and the styrene polymer solvent system discussed above may be blended. Because the blend of these solvent systems results in a miscible system, the properties of the blended system can be tailored as needed for particular application.

INDUSTRIAL APPLICABILITY

As discussed above, the solvent compositions and systems of the present invention may be used for many applications and determination of the particular components and ranges of components of the compositions and systems typically depends on the particular use of the compositions and/or systems. Frequently, additional materials and additives may be incorporated into the compositions and systems of the present invention, such as the tackifying resins discussed above.

In addition to the use of tackifying resins, colorants, additives, and fillers may be added to the solvent compositions and systems of the present invention. For example, approximately 1-10 weight percent of a colorant or pigment, such as those sold by Sun Chemical Corporation, may be incorporated into the solvent composition or polymer solvent system. Several colorants, including organic, inorganic and blended organic-inorganic colorants, may be used with the compositions and, systems of the present invention.

Further the solvent compositions and systems of the present invention may contain additives, agents, binders, suspenders, and/or viscosity modifiers such as cellulosics, including hydroxypropylcellulose or ethyl cellulose, polyvinylpyrrolidone and organo-clays. Typical viscosity modifiers preferably include those that are compatible with non-aqueous fluids/liquids as well propionates and/or butyrates, such as organo-clays. Ethyl cellulose at low percentages, such as 1-4 weight percent of the composition or system, typically improves bonding of the styrene solvent system to metals. Further, the synthetic rubber polymer may act as a binder/suspender in reduced quantities by helping to bond down fillers (i.e., pigments or inorganic additives) to modify the color and/or performance of these materials.

As discussed above, the solvent compositions of the present invention may be utilized as cleaners including removal of polymer resins and films since the solvents may be capable of dissolving such resins and films. Further, the solvent systems may be utilized as a glue and/or bonding agent. Because the solvent compositions and systems of the present invention are typically non-aqueous, water reactive compounds may be incorporated for use as paintable coatings. Further, such solvents, systems, and coatings may be encapsulated in order to reduce reactivity with water and extend their usefulness in an air-with-moisture environment.

Functional additives for the polymers such as antioxidants, light (UV) stabilizers, surfactants, plasticizers, tackifiers, dispersants, biocides, binders/suspenders, extenders, flame retardants, blocking agents, and lubricants as well as other rubber and plastic compounding ingredients and other "fillers", may be incorporated into the systems of the present invention. For example, additives such as those disclosed in U.S. Pat. Nos. 3,239,478; 4,536,454; 4,745,139; 5,315,940; and 5,777,043; as well as U.S. Patent Publication No 2005/0119403 A1 may be useful additives to the compositions and systems of the present Invention and are hereby incorporated by reference. These additives preferably do not change the properties including flammability of the solvent compositions and polymer systems of the present invention.

The solvent compositions and of the present invent systems may be combined with, a nonflammable propellant, such as HFC 134A propel or HFO-1234ze, when canned for use as an aerosol spray. The styrene solvent system of the present invention combined with a nonflammable propellant is capable of spraying on most substrates and compares to PlastiDip spray except that the spray of the present invention may be nonflammable, minimally a class IC flammable liquid. In contrast, PlastiDip spray is very flammable.

Further, the solvent system may incorporate boron nitride to enhance thermal conductivity and result in a nonflammable or low flammability brushable or dippable paint or coatings. Boron nitride may also be incorporated into a solvent system utilizing propellant for use as an aerosol can spray. The solvent system such as the system incorporating a synthetic rubber polymer may be used for sealing such as vacuum sealing or leak-sealing, or for creating an electrically insulating and flexible polymer layer, or coating. Such a flexible layer or film may o be used for making gaskets, for sealing mating surfaces for water protection to prevent water from reacting with highly water reactive material, and for preventing oxidation, rusting, and/or tarnishing due to gases, vapors, and liquids. Further, the solvent system utilizing polymers such as a styrene block copolymer or; methyl methacrylate copolymer may be used for sealing in fibers on the surface of porous ceramics such as lightweight fiber ceramic insulation. Advantageously, the solvent system may allow for safer handling and then burn off during initial heating in the furnace environment.

The solvent compositions and systems of the present invention may be used as protectants such as for mirrors and highly polished surfaces. For example a solvent system of the present invention that incorporate synthetic rubber polymer, may also incorporate tackifiers to create a peelable coating, which protects a surface but is easily removed. Alternatively, a discussed above, the solvent system may be used as a protectant on a substrate or surface without the addition of tackifiers. After application, the system will dry on a or substrate thereby creating a polymer film or layer that may provide chemical resistivity, corrosion protection, electrical insulation, and/or scratch/abrasion resistance. A solvent composition of the present invention can later be applied to the polymer film or layer when it is necessary to remove the film or layer. Additionally, the solvent compositions of the present invention may also be used to dissolve layers, films, and coatings other than polymer layers, films, and coatings without departing from the spirit and the scope of the invention.

Moreover, the above solvent system may be applied to metals that have a tendency to oxidize such as silver, to prevent tarnishing. Dissolving SEBS polymer with a 40/60 blend of HP with n-propyl bromide solvent composition results in a crystal clear coating that is particularly suitable for coating silver and reducing or preventing tarnishing for an extended period of time.

Further, the solvent system may be applied to all or part of a fiber surface to create additional traction when the fiber is tied together or to retain the shape and/or size of the fiber surface that may otherwise stretch or deform with extended use.

The solvent system of the present invention may be used to prevent water absorption which is particularly useful in high humidity regions. For example, a solvent system having SEBS polymer, may be used to coat a boron nitride hardcoat paint. The polymer coated paint can then protect the underlying paint from absorbing water and delaminating or weakening due to absorbed water. Because the solvent system having the SEBS polymer oxidizes away and burns off at high temperatures, such as 800 degrees Celsius, the polymer does not cause any problems or affect the performance of the boron nitride hardcoat when placed into its use-environment 800 degrees Celsius.

While various embodiments and examples of this invention have been described above, these descriptions are given for purposes illustration and explanation, and not limitation. Variations, changes, modifications, and departures from the compositions, systems, and methods disclosed above may be adopted without departure from the spirit and scope of this invention. In fact, after reading the above description, it will be apparent to one skilled in the relevant art(s) how to implement the invention in alternative embodiments. Thus, the present invention should not be limited by any of the above described exemplary embodiments.

Further, the purpose of the Abstract is to enable the examining office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A solvent system comprising a miscible solvent mixture comprising n-propyl bromide, a butyrate containing liquid and a synthetic rubber, wherein the solvent mixture dissolves the synthetic rubber to form a liquid rubber.

2. The solvent system of claim 1 wherein said butyrate containing liquid is amyl butyrate.

3. The solvent system of claim 1 wherein said butyrate containing liquid is n-butyl n-butyrate.

4. The solvent system of claim 1 wherein said mixture is nonflammable.

5. The solvent system of claim 1 wherein said mixture has a Kauri-Butanol solvency power greater than 75.

6. The solvent system of claim 1 wherein said mixture has a Kauri-Butanol solvency power greater than 100.

7. The solvent system of claim 1 wherein said system comprises 30 to 50 weight percent butyrate containing liquid.

8. The solvent system of claim 1 wherein said system is used as a liquid rubber agent.

9. The solvent system of claim 1 wherein said system is used as a paint carrier.

10. The solvent system of claim 1 wherein said system is applied to a metal surface and reduces tarnishing on said surface.

11. The solvent system of claim 1 wherein said system is used as a bonding-agent.

12. The solvent system of claim 11 wherein said system is a bonding agent for a polymer material comprising styrene-block-copolymer.

13. The solvent system of claim 1 wherein said composition further comprises functional additives selected from a tackifier, antioxidant, UV-stabilizer, surfactants, plasticizers, dispersants, biocides, binders, suspenders, extenders, flame retardants, blocking agents, lubricants, rubber compounding agents, and plastic compounding agents.

14. The solvent system of claim 1 wherein said system further comprises a nonflammable propellant and said composition is incorporated into an aerosol can.

15. The solvent system of claim 1 wherein said system further comprises additives selected from a cellulosic, polyvinylpyrrolidone, and organo-clay.

* * * * *